(12) United States Patent
Syed et al.

(10) Patent No.: US 11,820,382 B2
(45) Date of Patent: Nov. 21, 2023

(54) SYSTEM AND METHOD FOR SMOOTH TRANSMISSION ENGAGEMENT AND DISENGAGEMENT

(71) Applicant: Ford Global Technologies, LLC, Dearborn, MI (US)

(72) Inventors: Fazal U. Syed, Canton, MI (US); Zachary Sinisi, Westland, MI (US); Douglas Michael Smith, Ypsilanti, MI (US); Sassan Farahmand, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/657,072

(22) Filed: Mar. 29, 2022

(65) Prior Publication Data

US 2023/0311894 A1 Oct. 5, 2023

(51) Int. Cl.
| | |
|---|---|
| *F16H 61/04* | (2006.01) |
| *F16H 61/08* | (2006.01) |
| *B60W 30/19* | (2012.01) |
| *F02D 41/02* | (2006.01) |
| *B60W 10/06* | (2006.01) |

(Continued)

(52) U.S. Cl.
CPC ............ *B60W 30/19* (2013.01); *B60W 10/02* (2013.01); *B60W 10/06* (2013.01); *B60W 10/10* (2013.01); *F02D 41/0225* (2013.01); *F16H 61/08* (2013.01); *B60W 2510/10* (2013.01); *B60W 2710/021* (2013.01); *B60W 2710/0644* (2013.01); *B60W 2710/10* (2013.01); *F02D 2200/50* (2013.01); *F16H 2061/0481* (2013.01); *F16H 2061/0485* (2013.01); *F16H 2061/0488* (2013.01)

(58) Field of Classification Search
CPC ........... F02D 2200/50; F02D 41/0225; B60W 30/19; B60W 10/02; B60W 10/06; B60W 10/10; B60W 2510/10; B60W 2710/021; B60W 2710/0644; B60W 2710/10; F16H 61/08; F16H 2061/0481; F16H 2061/0485; F16H 2061/0488

See application file for complete search history.

(56) References Cited

U.S. PATENT DOCUMENTS

| 5,199,326 A | * | 4/1993 | Iwatsuki | F16H 61/0021 |
| | | | | 60/329 |
| 5,272,630 A | * | 12/1993 | Brown | B60W 10/10 |
| | | | | 477/121 |

(Continued)

FOREIGN PATENT DOCUMENTS

| EP | 354544 A2 | * | 2/1990 | ............ B60K 41/04 |
| EP | 3106651 A1 | * | 12/2016 | ............ B60W 10/06 |
| GB | 2490319 A | * | 10/2012 | ........... F02D 31/001 |

*Primary Examiner* — Tisha D Lewis
(74) *Attorney, Agent, or Firm* — David Kelley; McCoy Russell LLP (57) ABSTRACT

Systems and methods for transitioning a hybrid vehicle from park or neutral to drive or reverse are presented. In one example, a requested engine speed is adjusted in response to a transmission disengaging indication and a transmission disengaging timer when a transmission is being disengaged from a gear. In another example, the requested engine speed is adjusted in response to a transmission engaging indication and a transmission engaging timer when the transmission is being engaged to a gear.

19 Claims, 6 Drawing Sheets

(51) Int. Cl.
  *B60W 10/10* (2012.01)
  *B60W 10/02* (2006.01)

(56) References Cited

U.S. PATENT DOCUMENTS

| | | | | |
|---|---|---|---|---|
| 5,827,153 | A | * | 10/1998 | Yasue ................. F16H 61/0437 477/77 |
| 6,073,071 | A | * | 6/2000 | Yasue ................... F16H 61/061 701/87 |
| 10,065,626 | B2 | | 9/2018 | Wang et al. |
| 2005/0170930 | A1 | * | 8/2005 | Fett ....................... B60W 10/04 477/109 |
| 2005/0188953 | A1 | * | 9/2005 | Ishikawa ............... F02D 31/003 123/339.11 |
| 2016/0159357 | A1 | * | 6/2016 | Pursifull ......... B60W 30/18109 701/51 |
| 2019/0383226 | A1 | * | 12/2019 | Markman ........... F02D 41/0225 |
| 2020/0269702 | A1 | | 8/2020 | Meyer et al. |

\* cited by examiner

SYSTEM AND METHOD FOR SMOOTH TRANSMISSION ENGAGEMENT AND DISENGAGEMENT

FIELD

The present description relates to methods and a system for smoothing engagement and disengagement of a transmission. The methods and system may be applied to hybrid vehicles that may have higher neutral and park idle speeds than conventional vehicles.

BACKGROUND AND SUMMARY

An engine of a hybrid vehicle may be operated in a speed control mode during engine idle conditions while the hybrid vehicle is engaged in park, reverse, neutral, or drive. The requested engine idle speed may vary based on vehicle operating conditions. For example, the engine park idle speed may be 1400 revolutions/minute (RPM) when the engine has been recently cold started. The engine park idle speed may be 800 RPM when the engine is at operating temperature and while the hybrid vehicle's traction battery is not being charged. Further, the engine park idle speed may be 1500 RPM when the engine is warm and the hybrid vehicle's traction battery is being charged. If the hybrid vehicle's transmission is shifted from park to drive, the engine's idle speed may affect the engine's speed controller such that larger engine torques are requested during the transition from park to drive to compensate for a load on the transmission's torque converter turbine that reduces torque converter impeller speed and engine speed. As a result, the transition of shifting from park to drive may be characterized as rough due to a driveline torque disturbance. Similarly, transitions from drive or reverse to park or neutral may characterized as rough due at least in part to speed command changes that are part of the transition from drive or reverse to park or neutral.

The inventors herein have recognized the above-mentioned issues and have developed a method for operating a vehicle, comprising: adjusting a requested engine speed from an engine idle speed for park or an engine idle speed for neutral to an engine idle speed for drive or an engine idle speed for reverse via a controller in response to a transmission being in an engaging state.

By adjusting a speed of an engine according to a transmission engaging state, it may be possible to provide smoother transitions between operating a driveline in park or neutral and operating the driveline in drive or reverse. In particular, by adjusting engine speed during transmission gear engagement instead of after transmission gear engagement, engine speed and engine torque may be commanded lower while the torque converter turbine load is increasing so that the engine speed controller does not have to work against the torque converter turbine load for the engine to follow the requested engine speed. Consequently, driveline torque disturbances through the driveline during shifting into forward (drive) may be reduced. Additionally, adjustments to timing of engine speed commands may be applied during shifting out of transmission gears so that driveline torque disturbances caused by shifting out of gear may be reduced.

The present description may provide several advantages. In particular, the approach may improve hybrid driveline operation while an engine is operating in a speed control mode. Further, the approach may reduce driveline torque disturbances. Additionally, the approach may enable an engine of a hybrid vehicle to operate at speeds where charging of a battery may be more efficient during period where transmission shifting may occur.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
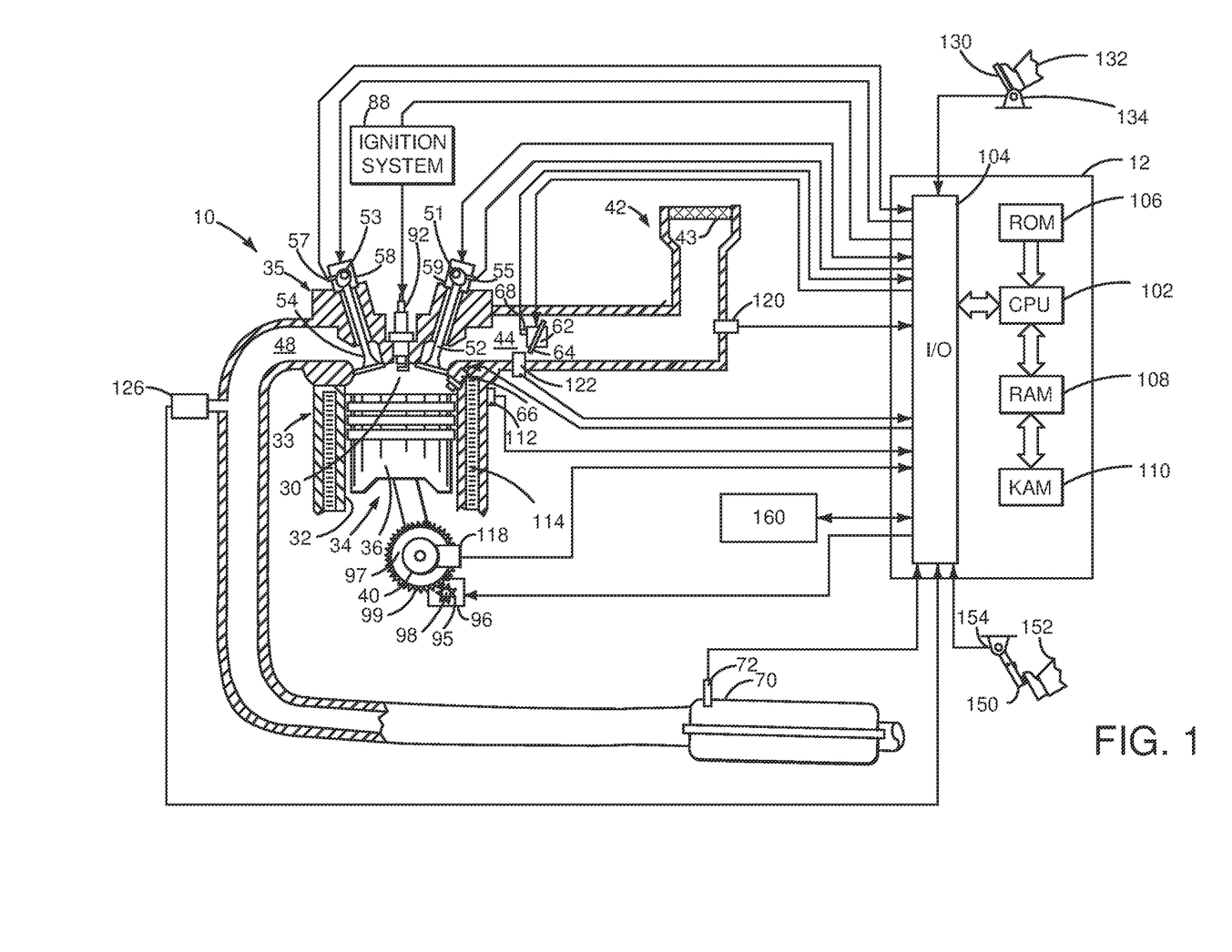
FIG. 1 is a schematic diagram of an engine.
Figure 2:
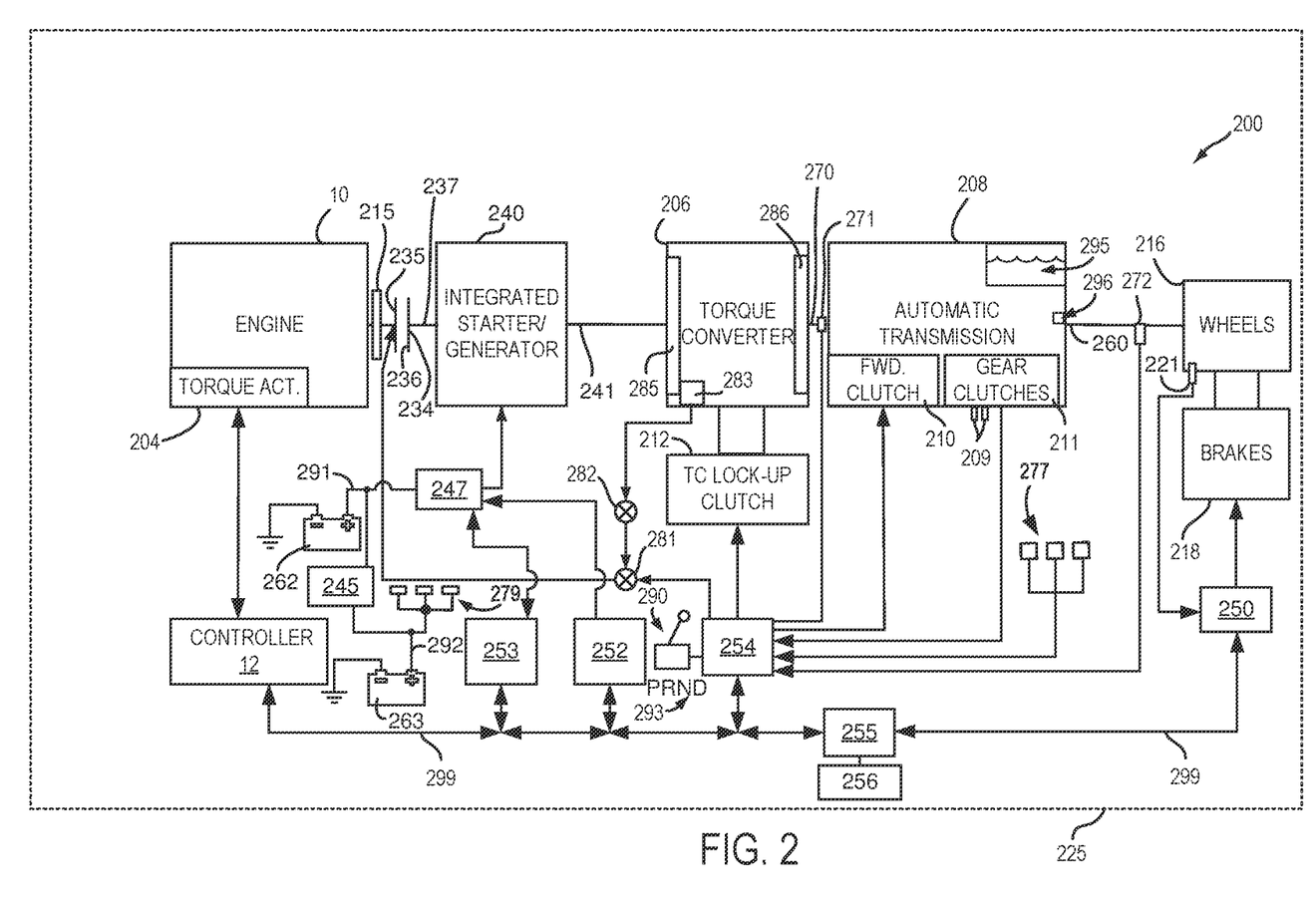
FIG. 2 is a schematic diagram of a hybrid vehicle driveline including the engine of FIG. 1.
Figure 3:
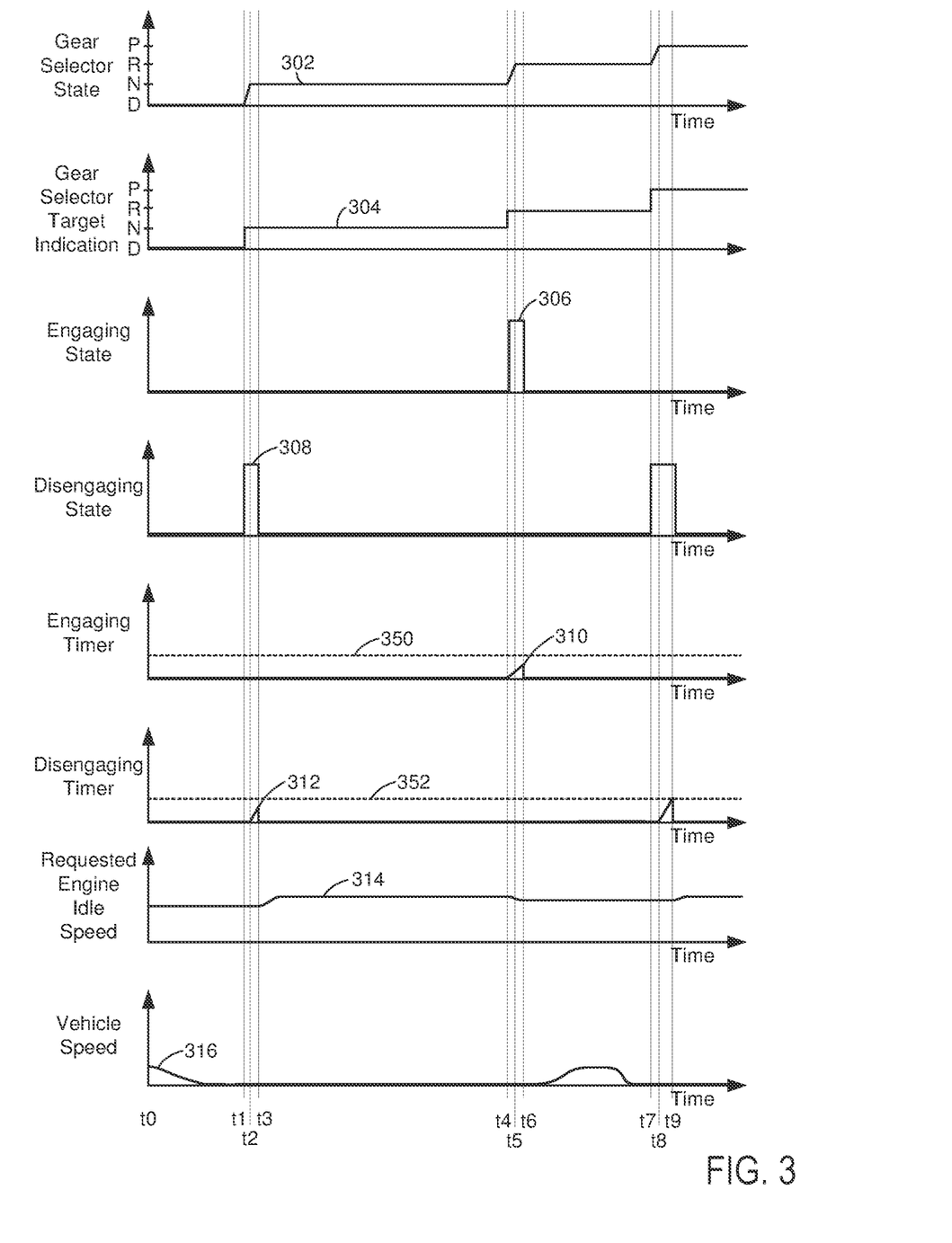
FIG. 3 shows an example sequence of an engine operating in a speed control mode according to the methods of FIGS. 4-6.
Figure 4:
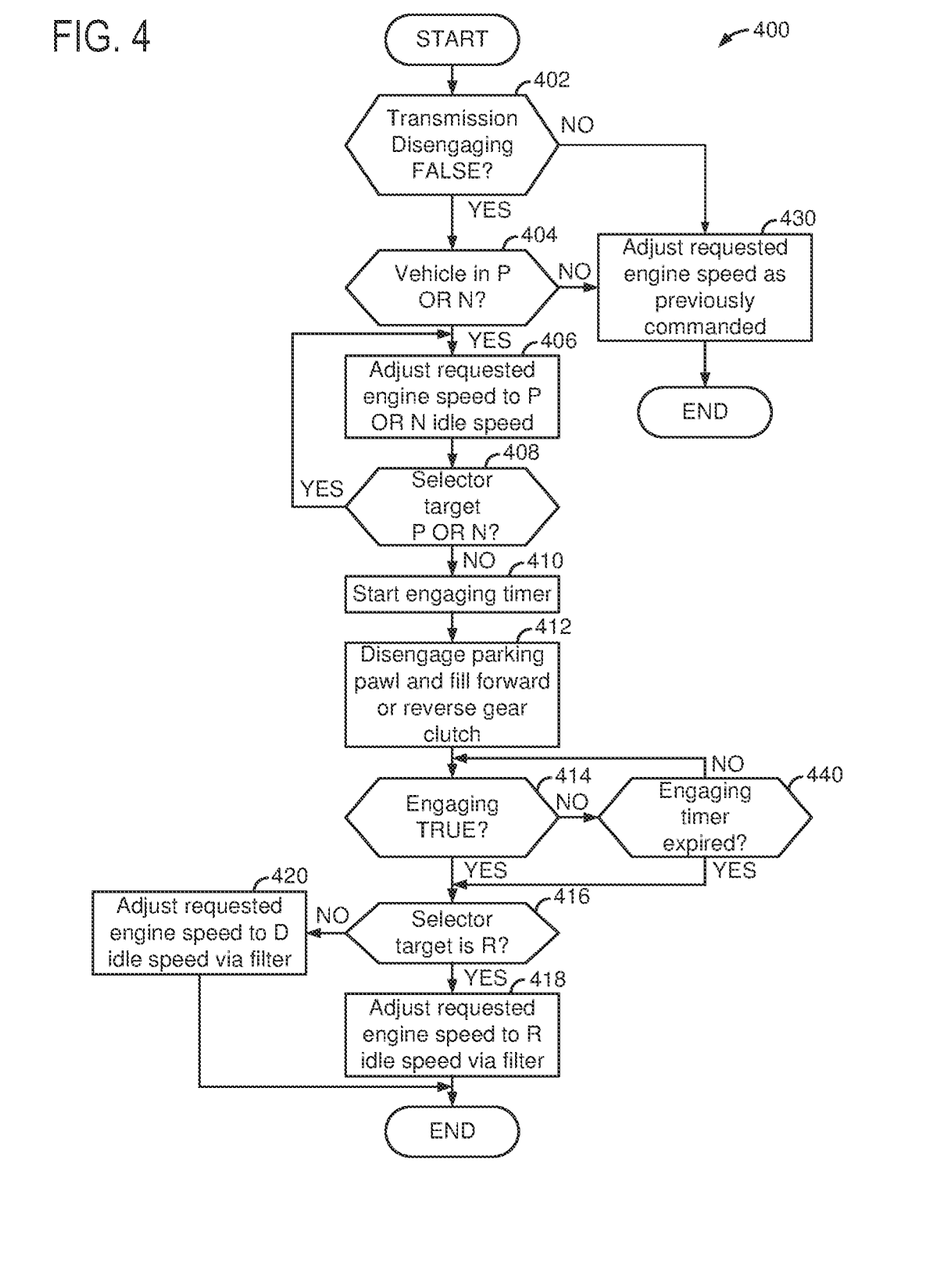
FIGS. 4-6 show methods for operating an engine of a hybrid vehicle in a speed control mode.
Figure 5:
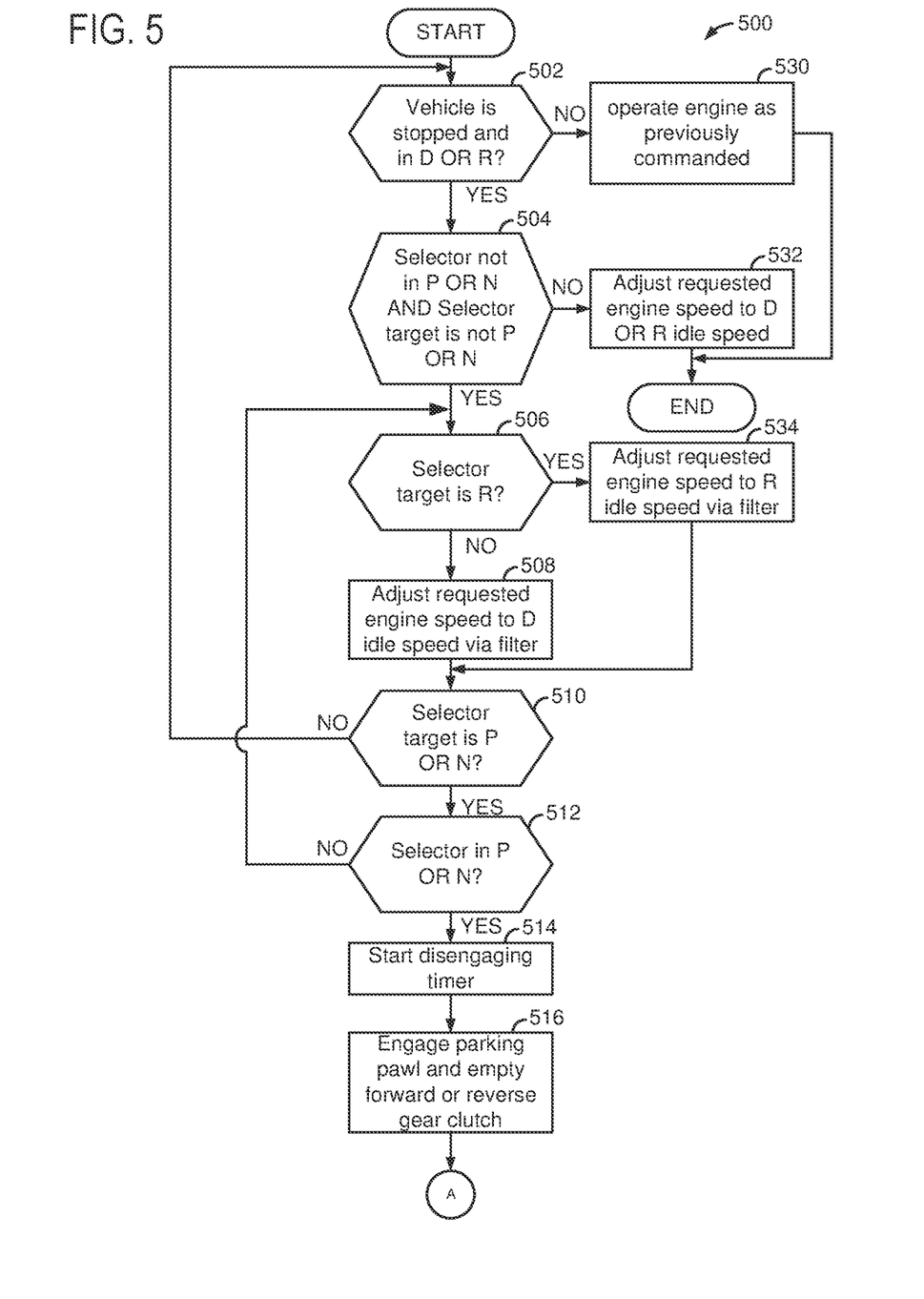
Figure 6:
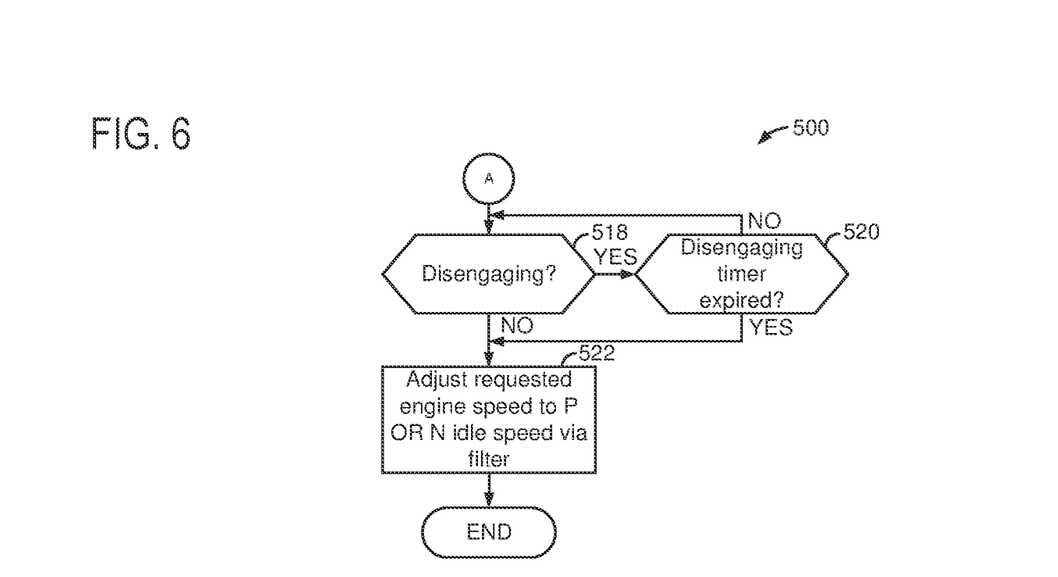

The present description is related to improving a transmission of a hybrid vehicle in and out of gear. In particular, torque disturbances that are related to gear shifting while operating an engine in a speed control mode may be improved. The engine may be of the type that is shown in FIG. 1. The engine may be part of a hybrid powertrain or driveline as shown in FIG. 2. An operating sequence according to the methods of FIG. 406 is shown in FIG. 3. FIGS. 4-6 show flowcharts of methods for controlling engine speed when shifting a transmission in and out of gear.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with energy storage device 262. Electric machine 240 has a higher output power capacity than starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electrical energy storage device 262 (e.g., high voltage battery or power source, which may be referred to as a traction battery) may be a battery, capacitor, or inductor. The downstream side of electric machine 240 is mechanically coupled to the impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate disconnect clutch 236, forward clutch 210, and gear clutches 211. Pump 283 is driven via impeller 285, which rotates at a same speed as electric machine 240.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N(where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an engine; a transmission; a controller including executable instructions stored in non-transitory memory that cause the controller to start a disengaging timer and adjust a requested engine speed to an engine idle speed for park or an engine idle speed for neutral in response to a transmission not being in a disengaging state or a value of the disengaging timer exceeding a threshold value. In a first example, the system includes where the engine idle speed for park is a requested engine idle speed for operating the engine when the transmission is in a park state. In a second example that may include the first example, the system includes where the engine idle speed for neutral is a requested engine idle speed for operating the engine when the transmission is in a neutral state. In a third example that may include one or both of the first and second examples, the system further comprises a gear selector for the transmission and additional instructions to request an engine drive idle speed in response to the gear selector not being in a park state or not being in a neutral position, and a target gear selector position not indicating park or neutral. In a fourth example that may include one or more of the first through third examples, the system further comprises additional instructions to request an engine reverse idle speed in response to the gear selector not being in a park state or not being in a neutral state, and a target gear selector position not indicating park or not indicating neutral. In a fifth example that may include one or more of the first and fourth examples, the system further comprises additional instructions to determine a vehicle is stopped before starting the disengaging timer. In a sixth example that may include one or more of the first and fifth examples. The system further comprises additional instructions to adjust the requested engine speed to an engine idle speed for neutral or an engine idle speed for park in response to a transmission being in an engaging state.

Referring now to FIG. 3, a prophetic driveline operating sequence is shown. The operating sequence of FIG. 3 may be provided via the system of FIGS. 1 and 2 in cooperation with the methods of FIGS. 4-6. The vertical lines at times t0-t9 represent times of interest during the operating sequence. The plots are time aligned. The sequence of FIG. 3 may be performed when the driveline disconnect clutch is fully closed so that the electric machine 240 is coupled to engine 10.

The first plot from the top of FIG. 3 is a plot of a gear selector state (e.g., state of 290 in FIG. 2) versus time. The vertical axis represents the gear selector state and the gear selector state may be park (P), reverse (R), neutral (N), or drive (D). The horizontal axis represents time and time increases from the left side of the plot to the right side of the plot. Trace 302 represents the gear selector state. The gear selector state is indicative of the gear selector position.

The second plot from the top of FIG. 3 is a plot of gear selector target indication versus time. The vertical axis represents the gear selector target indication and the gear selector target indication may be park (P), reverse (R), neutral (N), or drive (D). The horizontal axis represents time and time increases from the left side of the plot to the right side of the plot. Trace 304 represents the gear selector target indication. The gear selector target indication is indicative of the expected gear selector position at a time in the future. The gear selector target indication may be a variable in controller memory that is based on a prior position of the gear selector and a direction of motion of the gear selector. For example, if the gear selector was in its park position and it is moving toward its reverse position, the gear selector target indication may be reverse. Similarly, if the gear selector was in its drive position and it is moving toward its neutral position, the gear selector target indication may be neutral.

The third plot from the top of FIG. 3 is a plot of an engaging state of a transmission versus time. The vertical axis represents the engaging state of the transmission and the engaging state of the transmission is asserted (e.g., the transmission is in process of transitioning from being out of gear to being in gear) when trace 306 is at a higher level that is near the vertical axis arrow. The engaging state of the transmission is not asserted (e.g., the transmission is not in process of transitioning from being out of gear to being in gear) when trace 306 is at a lower level near the horizontal axis. The horizontal axis represents time and time increases from the left side of the plot to the right side of the plot. Trace 306 represents the engaging state of the transmission.

The fourth plot from the top of FIG. 3 is a plot of a disengaging state of a transmission versus time. The vertical axis represents the disengaging state of the transmission and the disengaging state of the transmission is asserted (e.g., the transmission is in process of transitioning from being in gear to being out of gear) when trace 308 is at a higher level that is near the vertical axis arrow. The disengaging state of the transmission is not asserted (e.g., the transmission is not in process of transitioning from being in gear to being out of gear) when trace 308 is at a lower level near the horizontal axis. The horizontal axis represents time and time increases from the left side of the plot to the right side of the plot. Trace 306 represents the disengaging state of the transmission.

The fifth plot from the top of FIG. 3 is a plot of a value of an engaging timer versus time. The vertical axis represents the value of the engaging timer and the value of the engaging timer increases in the direction of the vertical axis arrow. The value of the engaging timer is zero at the level of the horizontal axis. The horizontal axis represents time and time increases from the left side of the plot to the right side of the plot. Trace 310 represents the value of the disengaging timer. Horizontal line 350 represents a threshold engagement time at which the requested engine idle speed may be changed if the engagement timer exceeds the value of horizontal line 350.

The sixth plot from the top of FIG. 3 is a plot of a value of a disengaging timer versus time. The vertical axis represents the value of the disengaging timer and the value of the disengaging timer increases in the direction of the vertical axis arrow. The value of the disengaging timer is zero at the level of the horizontal axis. The horizontal axis represents time and time increases from the left side of the plot to the right side of the plot. Trace 312 represents the value of the disengaging timer. Horizontal line 352 represents a threshold engagement time at which the requested engine idle speed may be changed if the disengagement timer exceeds the value of horizontal line 352.

The seventh plot from the top of FIG. 3 is a plot of a requested engine idle speed versus time. The vertical axis represents the value of the requested engine idle speed and the value of the requested engine idle speed increases in the direction of the vertical axis arrow. The value of the requested engine idle speed is zero at the level of the horizontal axis. The horizontal axis represents time and time increases from the left side of the plot to the right side of the plot. Trace 314 represents the requested engine idle speed.

The eighth plot from the top of FIG. 3 is a plot of vehicle speed versus time. The vertical axis represents the vehicle speed and the vehicle speed increases in the direction of the vertical axis arrow. The value of the vehicle speed is zero at the level of the horizontal axis. The horizontal axis represents time and time increases from the left side of the plot to the right side of the plot. Trace 312 represents the vehicle speed.

At time t0, the vehicle is moving and the requested engine idle speed is an engine idle speed for drive (e.g., an engine idle speed for when the transmission is engaged in drive, such as 700 RPM). The engaged timer and the disengaged timer are not activated since the transmission is not being engaged or disengaged. The gear selector is in drive (D) and the gear selector target indication is drive. The engaging state is not activated and the disengaging state is not activated. The vehicle stops and does not move between time t0 and time t1.

At time t1, the vehicle operator (not shown) begins to move the gear selector. The gear selector target changes state from drive to neutral (N) based on the position of the gear selector and the direction of movement of the gear selector. The engaging state remains not asserted and the disengaging state becomes asserted at time t1 as pressure of a forward clutch begins to be reduced. The disengaging state may be defined as when the supply of transmission fluid to a reverse or forward clutch ceases while pressure of fluid in the reverse clutch or forward clutch is greater than a threshold pressure. The engaging timer and the disengaging timer are not activated. The requested engine idle speed remains unchanged while vehicle speed is zero.

At time t2, the gear selector is in the neutral position and the gear selector target position remains indicating neutral. The engaging state is not activated and the disengaging state remains activated. The engaging timer is not activated and the disengaging timer is activated such that it begins to accumulate or count an amount of time since the gear selector entered neutral.

At time t3, the disengage state changes state to not asserted, which causes the requested engine idle speed to change to engine idle speed for neutral (e.g., 1200-1500 RPM when charging the traction battery). The gear selector remains in neutral and the gear selector target indication remains neutral. The engaging state is unchanged and the engaging timer value is zero. The disengaging timer value is reset to zero since the disengaging state is not asserted. The vehicle speed remains zero. By beginning the adjustment of the requested engine idle speed to begin with the end of the time that the disengage state is asserted, the engine speed may be increased at a time when load on the torque converter turbine is reduced so that a smaller adjustment to engine torque may be made by the engine speed controller so that engine speed matches requested engine speed, thereby reducing the possibility of driveline torque disturbances during disengagement. The requested engine idle speed is filtered to the engine speed for neutral while vehicle speed is zero.

Between time t3 and time t4, the vehicle remains stationary and the transmission is not shifted. The various operating states remain unchanged.

At time t4, the vehicle operator (not shown) begins to move the gear selector. The gear selector target changes state from neutral to reverse (R) based on the position of the gear selector and the direction of movement of the gear selector. The engaging state transitions to asserted shortly after time t4 and the disengaging state remains unchanged and not asserted. The engaging state becomes asserted at time t4 as pressure of a reverse clutch begins to increase. The engaging state may be defined as when the transmission fluid is supplied to a reverse or forward clutch while pressure of transmission fluid in the reverse clutch or forward clutch is less than a threshold pressure. The engaging timer becomes activated in response to the gear selector reaching the reverse position and the disengaging timer is not activated. The requested engine idle speed is adjusted to engine idle speed for reverse in response to the engaging state being asserted. The vehicle speed remains zero.

At time t5, the gear selector is in the reverse position and the gear selector target position remains indicating reverse. The engaging state remains activated and the disengaging state is not activated. The engaging timer is activated and the disengaging timer is not activated. The requested engine idle speed is filtered to the engine idle speed for reverse while vehicle speed is zero.

At time t6, the transmission engaging state changes to not asserted. The gear selector remains in reverse and the gear selector target indication remains reverse. The engaging timer value is reset to zero in response to the engaging state being not asserted. The disengaging timer value remains zero since the disengaging state is not asserted. The vehicle speed remains zero.

Between time t6 and time t7, the vehicle moves in reverse and then the vehicle is stopped shortly before time t7. The gear selector remains in reverse and the gear selector target remains indicated as reverse. The engaging and disengaging states are not asserted. The engaging and disengaging timer values are zero. The requested engine idle speed remains at the engine idle speed for reverse.

At time t7, the vehicle operator (not shown) begins to move the gear selector. The gear selector target changes from indicating reverse to indicating park (P) based on the position of the gear selector and the direction of movement of the gear selector. The engaging state remains not asserted and the disengaging state becomes asserted at time t7 as pressure of a reverse clutch begins to be reduced. The engaging timer and the disengaging timer are not activated. The requested engine idle speed remains unchanged while vehicle speed is zero.

At time t8, the gear selector is in the park position and the gear selector target position remains indicating park. The engaging state is not activated and the disengaging state remains activated. The engaging timer is not activated and the disengaging timer is activated such that it begins to accumulate or count an amount of time since the gear selector entered park.

At time t9, the disengage timer reaches threshold 352, which causes the requested engine idle speed to change to engine idle speed for park (e.g., 1200-1500 RPM when charging the traction battery). The gear selector remains in park and the gear selector target indication remains park. The engaging state is unchanged and the engaging timer value is zero. The disengaging timer value is reset to zero shortly after time t9 since threshold 352 has been exceeded. The vehicle speed remains zero. The requested engine idle speed is filtered to the engine speed for park while vehicle speed is zero.

In this way, the requested engine speed may be adjusted so that a possibility of driveline torque disturbances may be reduced during engagement and disengagement from gears. The timing of requested engine idle speed changes relative to transmission gear engagement and disengagement Referring now to FIG. 4, a method for operating an engine of a hybrid vehicle in a speed control mode is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide at least portions of the operating sequence shown in FIG. 3. Further, controller 12 of FIG. 1 may include instructions to operate engine 10 in a speed control mode (e.g., engine torque is adjusted so that engine speed follows a requested engine speed, engine torque is allowed to vary so that engine speed may be followed) while the method of FIG. 4 is being performed.

At 402, method 400 judges whether or not the transmission is not in a disengaging state. In one example, the transmission may be indicted to not be in a disengaging state when a transmission disengaging variable value is FALSE. If method 400 judges that the transmission is not in the disengaging state, the answer is yes and method 400 proceeds to 404. Otherwise, the answer is false and method 400 proceeds to 430.

At 430, method 400 adjusts the requested engine speed as previously commanded. For example, if the requested engine idle speed was most recently commanded to an engine idle speed for reverse, the requested engine idle speed is the engine idle speed for reverse. Method 400 proceeds to exit.

At 404, method 400 judges whether or not the gear selector is positioned in park (P) or neutral (N). If so, the answer is yes and method 400 proceeds to 406. Otherwise, the answer is no and method 400 proceeds to 430.

At 406, method 400 adjusts the requested engine idle speed to engine idle speed for park (may be referred to as park engine idle speed) or engine idle speed for neutral (may be referred to as neutral engine idle speed). In particular, if the gear selector is in park, the requested engine idle speed is set to the engine idle speed for park. If the gear selector is in neutral, the requested engine idle speed is set to engine idle speed for neutral. In one example, the engine idle speed for park and engine idle speed for neutral may be a function of battery state of charge and engine temperature. Further, engine idle speed for park may be different than engine idle speed for neutral. Method 400 proceeds to 408.

At 408, method 400 judges whether or not the transmission gear selector target is indicated as park or neutral. If not, the answer is no and method 400 proceeds to 412. Otherwise, the answer is yes and method 400 returns to 406. The gear selector target indication may be indicative of a future operating state of the transmission.

At 410, method 400 starts an engaging timer. The engaging timer counts an amount of time that a transmission engaging state has been active for a most recent transmission engaging process (e.g., engaging a forward or reverse gear of a transmission). The engaging timer counts or accumulates time from zero. Method 400 proceeds to 412.

At 412, method 400 disengages the transmission's parking pawl and begins to fill the reverse gear clutch or a forward gear clutch. In this way the transmission engaging process may be initiated. Method 400 proceeds to 414.

At 414, method 400 judges whether or not the transmission is in an engaging state. The transmission may be in the engaging state when transmission fluid is supplied to the reverse gear clutch or a forward gear clutch while pressure in the reverse gear clutch or forward gear clutch is less than a threshold pressure (e.g., a pressure where the clutch is expected to be fully closed). If method 400 judges that the transmission is in the engaging state, the answer is yes and method 400 proceeds to 416. Otherwise, the answer is no and method 400 proceeds to 440.

At 440, method 400 judges whether or not a value of the engaging timer exceeds a threshold amount of time (e.g., 1.5 seconds). If so, the answer is yes and method 400 proceeds to 416. Otherwise, the answer is no and method 400 returns to 414.

At 416, method 400 judges whether or not the transmission gear selector is in the reverse position. If so, the answer is yes and method 400 proceeds to 418. Otherwise, the answer is no and method 400 proceeds to 420.

Thus, method 400 may proceed to 416 when the transmission is expected to be engaged in a forward gear or reverse gear such that the load on the torque converter turbine may begin to affect engine speed. These conditions may make it favorable to change the requested engine speed from engine idle speed for neutral or engine idle speed for park to engine idle speed for drive (may be referred to as drive engine idle speed) or engine idle speed for reverse (may be referred to as reverse engine idle speed).

At 420, method 400 adjusts the requested engine idle speed to engine idle speed for drive. The engine speed transition may be smoothed by applying a low pass filter to the requested engine speed. In addition, an engine speed controller may command the engine speed to the requested engine speed via adjusting one or more engine torque actuators (e.g., throttle, cam, etc.). Method 400 proceeds to exit.

At 418, method 400 adjusts the requested engine idle speed to engine idle speed for reverse. The requested engine speed transition may be smoothed by applying a low pass filter to the requested engine speed. In addition, an engine speed controller may command the engine speed to the requested engine speed via adjusting one or more engine torque actuators (e.g., throttle, cam, etc.). Method 400 proceeds to exit.

In this way, method 400 may control engine speed during transmission gear engagement to smooth a gear shift. The sequence of method 400 may reduce a possibility of driveline torque disturbances by controlling the timing at which the requested engine speed is changed so as to reduce a possibility of driveline torque disturbances.

Referring now to FIGS. 5 and 6, a method for operating an engine of a hybrid vehicle in a speed control mode is shown. The method may be at least partially implemented as executable instructions stored in controller memory in the system of FIGS. 1 and 2. Further, the method may include actions taken in the physical world to transform an operating state of the system of FIGS. 1 and 2. Additionally, the method may provide at least portions of the operating sequence shown in FIG. 3. Further, controller 12 of FIG. 1 may include instructions to operate engine 10 in a speed control mode (e.g., engine torque is adjusted so that engine speed follows a requested engine speed, engine torque is allowed to vary so that engine speed may be followed) while the method of FIG. 4 is being performed.

At 502, method 500 judges whether the vehicle is stopped and the gear selector is in a drive or reverse position. If so, the answer is yes and method 500 proceeds to 504. Otherwise, the answer is no and method 500 proceeds to 530.

At 530, method 500 continues to operate the engine as previously commanded. For example, if the engine is operating in a speed control mode, the engine may remain in a speed control mode. If the engine is operating in a torque control mode, the engine continues to operate in torque control mode. Method 500 proceeds to exit.

At 504, method 500 judges whether or not the gear selector is in a park or a neutral position and the gear selector target is indicated as not park or neutral. Thus, at 504, method 500 judges if the transmission selector is expected to change to drive or reverse. If method 500 judges that the gear selector is in park or neutral and the gear selector target is indicated as not park or not neutral, the answer is yes and method 500 proceeds to 506. Otherwise, the answer is no and method 500 proceeds to 532. Thus, to proceed to 504, the gear selector is in drive or reverse and the gear selector target indication is drive or reverse.

At 532, method 500 adjusts the requested engine speed to an engine idle speed for drive or an engine idle speed for reverse. In particular, if the gear selector is in the drive position, the requested engine idle speed is set to the engine idle speed for drive. If the gear selector is in the reverse position, the requested engine idle speed is set to engine idle speed for reverse. In one example, the engine idle speed for drive and engine idle speed for reverse may be a function of battery state of charge and engine temperature. Further, engine idle speed for drive may be different than engine idle speed for reverse. Method 500 proceeds to exit.

At 506, method 500 judges whether or not the gear selector target indication is reverse. If so, the answer is yes and method 500 proceeds to 534. Otherwise, the answer is no and method 500 proceeds to 508.

At 534, method 500 adjusts the requested engine idle speed to engine idle speed for reverse. The requested engine speed transition may be smoothed by applying a low pass filter to the requested engine speed. In addition, an engine speed controller may command the engine speed to the requested engine speed via adjusting one or more engine torque actuators (e.g., throttle, cam, etc.). Method 500 proceeds to 510.

At 508, method 500 adjusts the requested engine idle speed to engine idle speed for drive. The requested engine speed transition may be smoothed by applying a low pass filter to the requested engine speed. In addition, an engine speed controller may command the engine speed to the requested engine speed via adjusting one or more engine torque actuators (e.g., throttle, cam, etc.). Method 500 proceeds to 510.

At 510, method 500 judges whether or not the transmission gear selector target is indicated as park or neutral. If not, the answer is no and method 500 returns to 502. Otherwise, the answer is yes and method 500 proceeds to 512. Since proceeding from 504 to 506 occurs when the gear selector is in drive or reverse and the gear selector target indication is drive or reverse, proceeding to 510 requires a change in the indication of the gear selector target.

At 512, method 500 judges whether or not the gear shifter is in the park position or the reverse position. If so, the answer is yes and method 500 proceeds to 514. Otherwise, the answer is no and method 500 returns to 506.

At 514, method 500 starts a disengaging timer. The disengaging timer counts an amount of time that a transmission disengaging state has been active for a most recent transmission disengaging process (e.g., disengaging a forward or reverse gear of a transmission). The disengaging timer counts or accumulates time from zero. Method 500 proceeds to 516.

At 516, method 500 engages the transmission's parking pawl and begins to empty the reverse gear clutch or a forward gear clutch. In this way the transmission disengaging process may be initiated. Method 500 proceeds to 518.

At 518, if method 500 judges that the transmission is in a disengaging state (e.g., disengaging has not completed), the answer is yes and method 500 proceeds to 520. Otherwise, the answer is no and method 500 proceeds to 522.

At 520, method 500 judges whether or not a value of the disengaging timer exceeds a threshold amount of time (e.g., 1.5 seconds). If so, the answer is yes and method 500 proceeds to 522. Otherwise, the answer is no and method 500 returns to 518.

At 522, method 500 adjusts the requested engine speed to the engine idle speed for park or the engine idle speed for reverse. Specifically, if the gear selector is in the park position, the requested engine speed is adjusted to the engine idle speed for park. If the gear selector is in the neutral position, the requested engine speed is adjusted to the engine idle speed for neutral. Method 500 proceeds to exit.

Thus, method 500 may proceed to 518 when the transmission is expected to be engaged in a park or neutral such that the load on the torque converter turbine may begin to affect engine speed via reducing the load on the engine. These conditions may make it favorable to change the requested engine speed from engine idle speed for drive or engine idle speed for neutral to engine idle speed for park or engine idle speed for neutral.

In this way, method 500 may control engine speed during transmission gear disengagement to smooth a gear shift. The sequence of method 500 may reduce a possibility of driveline torque disturbances by controlling the timing at which the requested engine speed is changed so as to reduce a possibility of driveline torque disturbances.

Thus, the methods of FIGS. 4-6 provide for a method for operating a vehicle, comprising: adjusting a requested engine speed from an engine idle speed for park or an engine idle speed for neutral to an engine idle speed for drive or an engine idle speed for reverse via a controller in response to a transmission being in an engaging state. In a first example, the method includes where the engaging state includes supplying transmission fluid to a reverse clutch or a forward clutch while pressure of the transmission fluid in the reverse clutch or the forward clutch is less than a threshold pressure. In a second example that may include the first example, the method includes where adjusting the requested engine speed includes applying a filter to the requested engine speed. In a third example that may include one or both of the first and second examples, the method further comprises starting an engaging timer in response to a target gear shifter indication not being park or neutral. In a fourth example that may include one or more of the first through third examples, the method further comprises adjusting the requested engine speed from the engine idle speed for park or the engine idle speed for neutral to the engine idle speed for drive or the engine idle speed for reverse via the controller in response to a value of the engaging timer exceeding a threshold value. In a fifth example that may include one or more of the first through fourth examples, the method includes where adjusting the requested engine speed includes adjusting the requested engine speed in response to a target gear selector indication not being park or neutral. In a sixth example that may include one or more of the first through fifth examples, the method includes adjusting engine speed to the requested engine speed. In a seventh example that may include one or more of the first through sixth examples, the method includes where the requested engine speed is based on a traction battery state of charge.

The method of FIGS. 4-6 also provides for a method for operating a vehicle, comprising: adjusting a requested engine speed from an engine idle speed for drive or an engine idle speed for reverse to an engine idle speed for neutral or an engine idle speed for park via a controller in response to a transmission gear selector target transitioning from a drive indication or a reverse indication to a park indication or a neutral indication, a transmission gear selector being in a park state or a neutral state, and a transmission not being in a disengaging state; and adjusting a speed of an engine to the requested engine speed. In a first example, the method further comprises adjusting the requested engine speed to the engine idle speed for drive or the engine idle speed for reverse in response to the gear selector target indicating reverse or indicating drive. In a second example that may include the first example, the method includes where the engine idle speed for park is greater than the engine idle speed for drive. In a third example that may include one or both of the first and second examples, the method includes where the gear selector target is determined via a prior state of a gear selector and a direction of movement of the gear selector. In a fourth example that may include one or more of the first through third examples, the method further comprises starting a disengaging timer in response to the transmission gear selector being in the park state or the neutral state.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
starting an engaging timer in response to a gear selector target not being neutral or park;
adjusting a requested engine speed from an engine idle speed for park or an engine idle speed for neutral to an engine idle speed for drive or an engine idle speed for reverse via a controller in response to a transmission being in an engaging state and a value of the engaging timer value not exceeding a threshold, where the engaging state is when transmission fluid is being supplied to a forward or reverse clutch and pressure in the forward or reverse clutch is less than a threshold pressure; and
adjusting the requested engine speed from the engine idle speed for park or the engine idle speed for neutral to the engine idle speed for drive or the engine idle speed for reverse via the controller in response to the transmission not being in the engaging state and the value of the engaging timer value exceeding the threshold.

2. The method of claim 1, where the engaging state includes supplying a transmission fluid to a reverse clutch or a forward clutch while pressure of the transmission fluid in the reverse clutch or the forward clutch is less than a threshold pressure.

3. The method of claim 1, where adjusting the requested engine speed includes applying a filter to the requested engine speed.

4. The method of claim 1, further comprising starting an engaging timer in response to a gear selector target indication not being park or neutral.

5. The method of claim 1, further comprising:
adjusting a requested engine speed from the engine idle speed for drive or the engine idle speed for reverse to the engine idle speed for neutral drive or the engine idle speed for park via the controller in response to the transmission being in a disengaging state and a disengaging timer value not exceeding the threshold; and
adjusting the requested engine speed from the engine idle speed for drive or the engine idle speed for reverse to the engine idle speed for neutral or the engine idle speed for park via the controller in response to the transmission not being in the disengaging state and the disengaging timer value exceeding the threshold.

6. The method of claim 1, where adjusting the requested engine speed includes adjusting the requested engine speed in response to a gear selector target indication not indicating park or not indicating neutral.

7. The method of claim 1, further comprising adjusting engine speed to the requested engine speed.

8. The method of claim 1, where the requested engine speed is based on a traction battery state of charge.

9. A system, comprising:
an engine;
a transmission;
a gear selector; and
a controller including executable instructions stored in non-transitory memory that cause the controller to start a disengaging timer in response to the gear selector moving from reverse position or drive position into neutral or park position, and adjust a requested engine speed to an idle engine speed for park or an engine idle speed for neutral in response to not being in a disengaging state or a value of the disengaging timer exceeding a threshold value, where the disengaging timer counts an amount of time the disengaging state has been active when disengaging the transmission from a drive state or reverse state to a park state or a neutral state.

10. The system of claim 9, where the engine idle speed for park is a requested engine idle speed for operating the engine when the transmission is in the park state.

11. The system of claim 9, where the engine idle speed for neutral is a requested engine idle speed for operating the engine when the transmission is in the neutral state.

12. The system of claim 9, further comprising additional instructions to request an engine drive idle speed in response to the gear selector not being in a park position or not being in a neutral position, and a gear selector target not indicating park or neutral.

13. The system of claim 12, further comprising additional instructions to request an engine reverse idle speed in response to the gear selector not being in the park position or not being in the neutral position, and the gear selector target not indicating park or not indicating neutral.

14. The system of claim 9, further comprising additional instructions to determine a vehicle is stopped before starting the disengaging timer.

15. The system of claim 9, further comprising additional instructions to adjust the requested engine speed to the engine idle speed for neutral or the engine idle speed for park in response to the transmission being in an engaging state.

16. A method for operating a vehicle, comprising:
starting a timer that counts an amount of time a disengaging state has been active when disengaging the transmission from a drive state or reverse state to a park state or a neutral state; and
adjusting a requested engine speed from an engine idle speed for drive or an engine idle speed for reverse to an engine idle speed for neutral or an engine idle speed for park via a controller in response to the timer exceeding a threshold and a transmission being in a disengaging state, or in response to the timer not exceeding the threshold and the transmission not being in a disengaging state; and
adjusting a speed of an engine to the requested engine speed.

17. The method of claim 16, further comprising adjusting the requested engine speed to the engine idle speed for drive or the engine idle speed for reverse in response to the gear selector target indicating reverse or drive.

18. The method of claim 16, where the engine idle speed for park is greater than the engine idle speed for drive.

19. The method of claim 16, where the gear selector target is determined via a prior state of the gear selector and a direction of movement of the gear selector.

* * * * *